March 30, 1954   H. H. HESTON   2,673,732
CROSS SPRING ACTION AND STABILIZING FOR VEHICLES
Filed June 5, 1951

INVENTOR
*Howard H. Heston*

BY

ATTORNEY

Patented Mar. 30, 1954

2,673,732

UNITED STATES PATENT OFFICE 2,673,732

CROSS SPRING ACTION AND STABILIZING FOR VEHICLES

Howard H. Heston, Ashland, Ohio

Application June 5, 1951, Serial No. 230,050

5 Claims. (Cl. 267—20)

The present invention relates to a device in the nature of a reverse and cross spring action as a means for stabilizing all types of vehicles and comprises the combination, constructions and arrangements herein described and claimed.

The invention in general provides for a change in spring suspension for vehicles whereby pressure on the right wheels exerts a downward pressure to springs positioned on the left while pressure on the left wheels will exert downward pressure on the springs on the right side of such chassis. This action tends to eliminate or absorb the sudden shocks generally experienced in present day methods when the pressure or shock is great enough to overcome the weight of the vehicle.

It is therefore an object of the invention to provide novel means for the stabilizing of a vehicle.

Another object of the invention is the provision of a device as described that provides a novel spring construction that may be readily applied to any conventional vehicle axle.

Another object of the invention is the providing of a means for not only stabilizing a vehicle but to level same.

A further object of the invention is to provide a shock-absorbing device for vehicles in general whereby shock is dissipated by means of a system of levers, or arms in conjunction with springs.

A still further object of the invention is to provide a device as described that is not expensive and readily installed on the chassis of vehicles in general, particularly motor vehicles.

These and other objects and the novel features of my invention will be clearly and fully set forth in the following specification and claims in conjunction with the accompanying drawing, in which:

Figure 1:
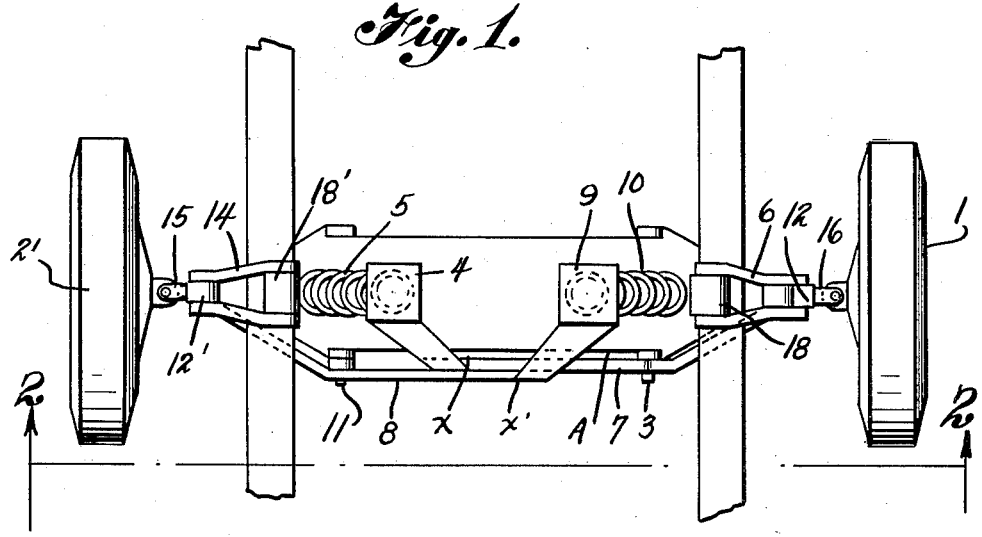
Figure 1 is a plan view looking at the invention from the top as installed on the front end of a vehicle chassis.

Referring more particularly to the drawings wherein similar reference characters designate like parts throughout the views, the letter A refers to the front part of a vehicle chassis or frame of conventional design embodying the usual wheels, of which only the front wheels 1 and 2' are shown.

Figure 2:
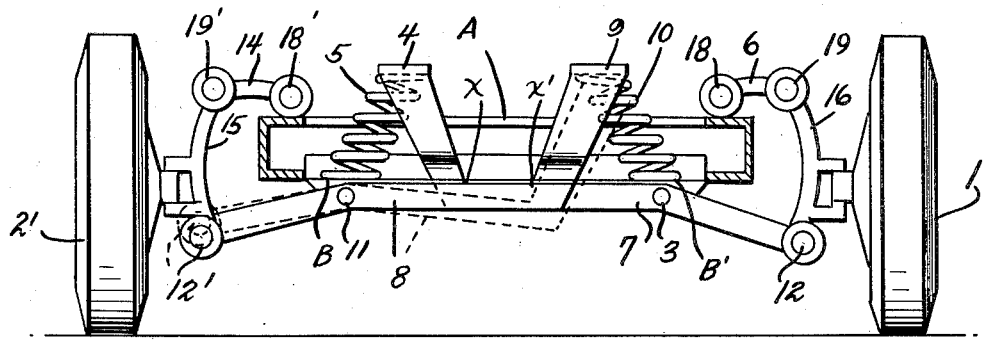
Figure 2 is a sectional view taken on the line 2—2 of Figure 1 and looking in the direction of the arrows.
Figure 3:
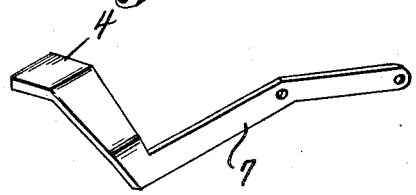
Figure 3 is a perspective view of one of the arms or levers.

Referring to Figure 2, a transversely extending angularly disposed arm or lever 7 is pivotally connected, intermediate its ends, to the front of the chassis A adjacent one side, as at 3. The arm 7 is pivotally connected at its lower end by a pin 12 to the lower end of a vertically disposed link 16 suitably connected in the usual manner to the left front wheel 1; with the upper end of the link 16 being pivotally connected, as at 19, to one end of a relatively short link member 6 having its other end pivotally connected to the chassis, as at 18. The arm 7 extends inwardly and substantially transversely of the chassis from the pivot 3 to a point X on the opposite or right hand side of the longitudinal axis or center of the chassis from which point the arm extends upwardly and then rearwardly and terminates in a rearwardly extending flattened flanged portion 4. The portion 4 of the arm 7 abuts and seats upon the upper end of an angularly disposed coil spring 5 suitably mounted on and secured to the chassis A at the point B which is on the right hand side of the longitudinal axis of the chassis. It will be noted that the longitudinal axis of the spring 5 lies substantially along the path traveled by the portion 4 of the arm 7 as the arm swings about its pivot 3. This arrangement assures that the maximum amount of the force which is applied to the arm 7 will be transmitted to the chassis A at the point B.

A second arm or lever 8 is pivotally connected, intermediate its ends, to the front of chassis A adjacent one side, as at 11. The arm 8 is correspondingly pivotally connected at its lower end by a pin 12' to the lower end of a vertically disposed link 15 suitably connected in the usual manner to the right front wheel 2', with the upper end of the link 15 being pivotally connected, as at 19', to one end of a relatively short link member 14 having its other end pivotally connected to the chassis, as at 18'. The arm 8 extends inwardly and substantially transversely of the chassis from the point 11 to a point X' on the opposite or left hand side of the longitudinal axis or center of the chassis from which point the arm 8 extends upwardly and then rearwardly and terminates in a rearwardly extending flattened flanged portion 9. The portion 4 of the arm 8 abuts and seats upon the upper end of an angularly disposed coil spring 10 suitably mounted on and secured to the chassis A at the point B' which is on the left hand side of the longitudinal axis of the chassis. It will be noted that the longitudinal axis of the spring 10 lies substantially along the path traveled by the portion 9 of the arm 8 as the arm swings about its pivot 11. This arrangement assures that the maximum amount of the force which is applied to the arm 8 will be transmitted to the chassis A at the point B'.

The transversely extending portion of the arm 8 is disposed forwardly of the corresponding portion of the arm 7 and the inner end parts of the transversely extending portions of the arms 7 and 8 are substantially parallel to one another and cross one another.

From the foregoing, it will be understood that the arms 7 and 8 are pivotally connected to opposite sides of the chassis A and are pivotally connected to the lower ends of the respective wheel links 16 and 15. The arms 7 and 8 extend upwardly at opposing angles, with the arms crossing and clearing each other, and the upper ends thereof abut the respective opposing angularly disposed coil springs 5 and 10.

Thus for example, if the left wheel 1 goes over a bump, the left wheel will be forced upwardly and through the links 16 and 6, the adjacent side of the chassis and the lower end portion of the arm 7 will be moved upwardly and the right side of the chassis will be moved downwardly. The inner end portion of the arm 7 and its portion 4 will be swung downwardly thereby forcing the spring 5 and the right side of the chassis downwardly and the right wheel 2' into firmer contact with the road so that the road will serve as a pressure point or solid base. This will cause the right wheel 2' to move upwardly and carry the right side of the chassis and the lower portion of the arm 8 upwardly, as illustrated in dotted lines in Figure 2 of the drawings. The inner end portion of the arm 8 will thus be swung downwardly as shown in dotted lines in Figure 2 and the spring 10 compressed to move the left side of the chassis downwardly.

The fact that the lower end portions of the springs 5 and 10 are secured to the chassis in substantial vertical alignment with the pivots 3 and 11, when pressure is applied to one of the springs such pressure will be transmitted downwardly through the spring at the fulcrum point of the other arm and thereby distribute some of the pressure to the other spring. This is the same as the conventional knee action assembly modified by extending the front forging to a spring on the opposite side of the vehicle and the pivot point of the front forging becomes a fulcrum point for the arm to the other spring on the opposite side. In other words, by virtue of the solid fulcrum points 3 and 11, an upward pressure on wheel 1 will transmit through arm 7 a downward pressure on spring 5 at its upper end and thereby effect stability. As an example, on a curve to the left, the weight of the vehicle shifts principally to the right wheels whereby weight, applied to the right side, will effect through arm 7 a downward pressure on the opposite or left side of the vehicle.

In addition to the foregoing, the herein described spring suspension eliminates any sudden shocks experienced when the pressure or shock is great enough to overcome the weight of the vehicle. For example, any shock or upward pressure on wheel 1 is transmitted through arm 7 to spring 5 on the opposite side of the vehicle. Due to the fulcrum point 3, the upward pressure on wheel 1 is converted to a downward pressure on the vehicle through spring 5. Thus, the road bed is indirectly employed as the pressure point or solid base with which to control the ride which eliminates the prior art practice of using the weight of the vehicle and gravity as the principal factors for controlling the ride.

Another advantage is that it also will stabilize itself, as for instance, when making a turn to the left, the weight of the wheel shifts to the right and the left side of the vehicle raises in this respect, that as the weight shifts to the right the spring arms exert a downward pressure to the left side, and, the more the weight the more the pressure and holds the vehicle in a level position.

This type of spring suspension is also adaptable to a solid axle such as the rear axle of a motor vehicle.

It will be further observed that the springs 5 and 8 are mounted, not in a vertical position as in similar devices, but in an inclined position with the tops nearer each other than the lower ends. This causes the springs to receive the downward pressure from the upper attached ends of the arms 7 and 8 in a direction along the axis of such springs, as it will be quite obvious that the pressure on the upper end of each of such arms will not be in a vertical but in a direction coinciding with the slant, or incline of such springs, thus rendering the full capacity of such springs available for the purposes specified. The springs are thus adapted to act independently of each other, or in the event pressure is exerted on both of the wheels at the same time, the springs will then coact with each other for the purposes as specified.

I have shown my invention in an exemplary form and structure, however adaptations in use may require modifications in form, or parts without departing from the basic features or the spirit of the invention.

What I claim and desire to secure by Letters Patent, is:

1. A device of the character described comprising in combination with a vehicle chassis and wheels, a pair of arms pivotally connected to opposite sides of said chassis and extending transversely and upwardly, a pair of upwardly and inwardly inclined coil springs mounted on opposite sides of said chassis, link members mounting said wheels, said arms being pivotally connected to the lower ends of said link members, said arms being angularly disposed relative to each other and crossing each other with the upper ends thereof abutting the upper ends of said springs respectively whereby pressure applied to one side of the vehicle will be transmitted through one of said arms to the spring associated therewith to apply a downward pressure on the other side of the vehicle.

2. A device of the character described comprising in combination with a vehicle chassis and wheels, a pair of arms pivotally connected to opposite sides of said chassis and extending transversely and upwardly, a pair of upwardly and inwardly inclined coil springs mounted on opposite sides of said chassis, vertical link members mounting said wheels, said arms being pivotally connected to the lower ends of said link members, link members pivotally connected to said chassis, and the upper ends of said first mentioned link members being pivotally connected to the adjacent ends of said last mentioned link members, said arms being angularly disposed relative to each other and crossing each other with the upper ends thereof abutting the upper ends of said springs respectively whereby pressure applied to one side of the vehicle will be transmitted through one of said arms to the spring associated therewith to apply a downward pressure on the other side of the vehicle.

3. A device of the character described comprising in combination with a vehicle chassis and a pair of wheels, link members mounting said wheels on opposite sides of the chassis respectively, a pair of arms associated with said pair of wheels, one of said pair of arms being pivotally connected to said chassis on one side of the longitudinal center of the chassis and pivotally connected to the adjacent link member, said one arm extending transversely and upwardly of said chassis to a point on the opposite side of the longitudinal center of the chassis, a spring having its lower end seated on said chassis on said opposite side of the chassis and inclined upwardly and inwardly, the free end of the extended portion of said arm abutting the upper end of said spring, the other arm of said pair of arms being pivotally connected to said chassis on said opposite side of the chassis and to the adjacent link member, said other arm extending transversely and upwardly of said chassis to a point on said one side of the chassis, and a second spring having its lower end seated on said chassis on said one side of the chassis and inclined upwardly and inwardly, the free end of the extended portion of said other arm abutting the upper end of said second spring.

4. A device as claimed in claim 3 wherein the lower end of the first spring is in substantial vertical alignment with the pivotal connection of said other arm and the lower end of said second spring is in substantial vertical alignment with the pivotal connection of said one arm.

5. A device as claimed in claim 3 wherein the axis of each spring substantially coincides with the path of travel of the free end of the extended portion of its arm about the pivotal connection of the arm.

HOWARD H. HESTON.

References Cited in the file of this patent

UNITED STATES PATENTS

| Number | Name | Date |
|---|---|---|
| 1,212,987 | Morrow | Jan. 16, 1917 |
| 2,043,889 | Erb | June 9, 1936 |
| 2,075,585 | Martin | Mar. 30, 1937 |
| 2,260,634 | Mullner | Oct. 28, 1941 |

FOREIGN PATENTS

| Number | Country | Date |
|---|---|---|
| 393,445 | Great Britain | June 8, 1933 |